US008084110B2

(12) United States Patent
Wu et al.

(10) Patent No.: US 8,084,110 B2
(45) **Date of Patent: *Dec. 27, 2011**

(54) GLYCOLURIL RESIN AND POLYOL RESIN MEMBERS

(75) Inventors: Jin Wu, Webster, NY (US); Jonathan H Herko, Walworth, NY (US); Scott J Griffin, Fairport, NY (US); Michael S Roetker, Webster, NY (US); Dennis J Prosser, Walworth, NY (US); Dante M Pietrantoni, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 422 days.

This patent is subject to a terminal disclaimer.

(21) Appl. No.: 12/413,783

(22) Filed: Mar. 30, 2009

(65) Prior Publication Data

US 2010/0248107 A1 Sep. 30, 2010

(51) Int. Cl.

| | |
|---|---|
| ***B32B 1/08*** | (2006.01) |
| ***B32B 27/08*** | (2006.01) |
| ***B32B 27/20*** | (2006.01) |
| ***B32B 27/30*** | (2006.01) |
| ***B32B 27/34*** | (2006.01) |
| ***B32B 27/36*** | (2006.01) |

(52) U.S. Cl. .................. 428/36.91; 428/411.1; 428/412; 428/421; 428/422; 428/473.5; 428/474.4; 428/480; 428/522; 399/308

(58) Field of Classification Search ........................ None
See application file for complete search history.

(56) References Cited

U.S. PATENT DOCUMENTS

| | | | | |
|---|---|---|---|---|
| 5,487,707 | A | 1/1996 | Sharf et al. | |
| 6,318,223 | B1 | 11/2001 | Yu et al. | |
| 6,440,515 | B1 | 8/2002 | Thornton et al. | |
| 6,602,156 | B2 | 8/2003 | Schlueter, Jr. | |
| 7,031,647 | B2 | 4/2006 | Mishra et al. | |
| 7,130,569 | B2 | 10/2006 | Goodman et al. | |
| 7,139,519 | B2 | 11/2006 | Darcy, III et al. | |
| 7,910,183 | B2 | 3/2011 | Wu | |
| 7,923,188 | B2 * | 4/2011 | Lin et al. | 430/59.6 |
| 2004/0221942 | A1 * | 11/2004 | Yu et al. | 156/157 |
| 2007/0248813 | A1 * | 10/2007 | Wu et al. | 428/337 |
| 2010/0247918 | A1 | 9/2010 | Wu | |
| 2010/0247919 | A1 | 9/2010 | Wu | |
| 2010/0248102 | A1 | 9/2010 | Wu | |
| 2010/0248103 | A1 | 9/2010 | Wu | |
| 2010/0248104 | A1 | 9/2010 | Wu | |
| 2010/0248106 | A1 | 9/2010 | Wu | |
| 2010/0248108 | A1 | 9/2010 | Wu et al. | |
| 2010/0249322 | A1 | 9/2010 | Wu | |

OTHER PUBLICATIONS

Jin Wu et al., U.S. Appl. No. 12/200,147 entitled Coated Seamed Transfer Member, filed Aug. 28, 2008.

Jin Wu et al., U.S. Appl. No. 12/200,179 entitled Coated Transfer Member, filed Aug. 28, 2008.

Jonathan Herko et al., U.S. Appl. No. 11/895,255 entitled Flexible Imaging Member Belt Seam Smoothing Process, filed Aug. 22, 2007.

Jin Wu, U.S. Appl. No. 12/129,995 on Polyimide Intermediate Transfer Components, filed May 30, 2008.

Jin Wu, U.S. Appl. No. 12/181,354, on Core Shell Intermediate Transfer Components, filed Jul. 29, 2008.

Jin Wu, U.S. Appl. No. 12/181,409 on Treated Carbon Black Intermediate Transfer Components, filed Jul. 29, 2008.

* cited by examiner

*Primary Examiner* — Ramsey Zacharia
(74) *Attorney, Agent, or Firm* — Oliff & Berridge, PLC

(57) ABSTRACT

An intermediate transfer member, such as a belt, where the seam or seams thereof on the member contain a coating mixture of a glycoluril resin and a polyol resin.

21 Claims, No Drawings

GLYCOLURIL RESIN AND POLYOL RESIN MEMBERS

CROSS REFERENCE TO RELATED APPLICATIONS

Copending U.S. application Ser. No. 12/413,627, U.S. Publication No. 20100248103, filed Mar. 30, 2009, entitled Resin Mixture Backing Layer Containing Photoconductor, the disclosure of which is totally incorporated herein by reference, illustrates a photoconductor comprising a substrate, an imaging layer thereon, and a backing layer located on a side of the substrate opposite the imaging layer wherein the outermost layer of the backing layer adjacent to the substrate is comprised of a glycoluril resin, and a polyol resin mixture.

Copending U.S. application Ser. No. 12/413,633, U.S. Publication No. 20100249322, filed Mar. 30, 2009, entitled Fluorinated Sulfonic Acid Polymer Grafted Polyaniline Containing Intermediate Transfer Members, the disclosure of which is totally incorporated herein by reference, illustrates an intermediate transfer member comprised of a substrate, and in contact therewith a polyaniline having grafted thereto a fluorinated sulfonic acid polymer.

Copending U.S. application Ser. No. 12/413,638, U.S. Publication No. 20100247918, filed Mar. 30, 2009, entitled Perfluoropolyether Polymer Grafted Polyaniline Containing Intermediate Transfer Members, the disclosure of which is totally incorporated herein by reference, illustrates an intermediate transfer member comprised of a substrate and in contact with the substrate a polyaniline grafted perfluoropolyether phosphoric acid polymer.

Copending U.S. application Ser. No. 12/413,642, U.S. Publication No. 20100247919, filed Mar. 30, 2009, entitled Fluorotelomer Grafted Polyaniline Containing Intermediate Transfer Members, the disclosure of which is totally incorporated herein by reference, illustrates An intermediate transfer member comprised of a substrate, and a layer comprised of polyaniline having grafted thereto a fluorotelomer.

U.S. application Ser. No. 12/413,645, now U.S. Pat. No. 7,910,183, filed Mar. 30, 2009, entitled Layered Intermediate Transfer Members, the disclosure of which is totally incorporated herein by reference, illustrates an intermediate transfer member comprised of a polyimide substrate, and thereover a polyetherimide/polysiloxane.

Copending U.S. application Ser. No. 12/413,651, U.S. Publication No. 20100248106, filed Mar. 30, 2009, entitled Polyimide Polysiloxane Intermediate Transfer Members, the disclosure of which is totally incorporated herein by reference, illustrates an intermediate transfer member comprised of at least one of a polyimide/polyetherimide/polysiloxane, and a polyimide polysiloxane.

Copending U.S. application Ser. No. 12/413,795, U.S. Publication No. 20100248108, filed Mar. 30, 2009, entitled Glycoluril Resin And Polyol Resin Dual Members, the disclosure of which is totally incorporated herein by reference, illustrates a process which comprises providing a flexible belt having at least one welded seam extending from one parallel edge to the other parallel edge of the coating, the welded seam having a rough seam region comprising an overlap of two opposite edges; contacting the rough seam region with a heat and pressure applying tool; and smoothing out the rough seam region with heat and pressure applied by the heat and pressure applying tool, and subsequently coating the belt with a resin mixture of a glycoluril resin and a polyol resin.

Copending U.S. application Ser. No. 12/413,832, U.S. Publication No. 20100248104, filed Mar. 30, 2009, entitled Polyaniline Dialkylsulfate Complexes Containing intermediate Transfer Members, the disclosure of which is totally incorporated herein by reference, illustrates an intermediate transfer member comprised of a polyaniline dialkylsulfate complex.

Copending U.S. application Ser. No. 12/413,852, U.S. Publication No. 20100248102, filed Mar. 30, 2009, entitled Crosslinked Resin Mixture Backing Layer Containing Photoconductor, the disclosure of which is totally incorporated herein by reference, illustrates a photoconductor comprising a substrate, an imaging layer thereon, and a backing layer located on a side of the substrate opposite the imaging layer wherein the outermost layer of the backing layer adjacent to the substrate is comprised of a mixture of glycoluril resin and a polyacetal resin mixture.

Illustrated in U.S. application Ser. No. 12/200,147, U.S. Publication No. 20100055328, entitled Coated Seamed Transfer Member, filed Aug. 28, 2008, is a process which comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the seam with a crosslinked acrylic resin.

Illustrated in U.S. application Ser. No. 12/200,179, U.S. Patent Publication No. 20100051171, entitled Coated Transfer Member, filed Aug. 28, 2008, is a process which comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the belt with a crosslinked acrylic resin.

Illustrated in U.S. application Ser. No. 11/895,255, U.S. Patent Publication No. 20090050255, filed Aug. 22, 2007, the disclosure of which is totally incorporated here by reference, is a process for the post treatment of an ultrasonically welded seamed flexible imaging member belt comprising providing a flexible belt having a welded seam extending from one parallel edge to the other parallel edge, the welded seam having a rough seam region comprising an overlap of two opposite edges; positioning the flexible belt on a lower anvil such that the flexible belt is held in position on the lower anvil by vacuum; contacting the rough seam region with a heat and pressure applying tool; and smoothing out the rough seam region with heat and pressure applied by the heat and pressure applying tool to produce a flexible belt having a smooth welded seam without removing the seam material.

BACKGROUND

Disclosed are intermediate transfer members, and more specifically, coated seamed intermediate transfer members useful in transferring a developed image in an electrostatographic, for example xerographic, including digital, image on image, and the like, printers, machines or apparatuses. In embodiments, there are selected, for example, seamed intermediate transfer members comprised of a conductive material like carbon black, a polyaniline, or mixtures thereof dispersed in a polymer solution, such as a polyamic acid solution illustrated in copending U.S. application Ser. No. 12/129,995, U.S. application Ser. No. 12/181,354, and U.S. application Ser. No. 12/181,409, the disclosures of which are totally incorporated herein by reference; and thereafter, applying a crosslinked mixture of a glycoluril resin and a polyol resin onto the seam.

Intermediate transfer belts can be generated in the form of seamed belts fabricated by fastening two ends of a web material together, such as by welding, sewing, wiring, stapling, or gluing. While seamless intermediate transfer belts are known, they may require manufacturing processes that render them more costly as compared to similar seamed intermediate transfer belts.

Seamed belts can be fabricated from a sheet cut that originates from an imaging member web. The sheets are generally rectangular, or in the shape of a parallelogram where the seam does not form a right angle to the parallel sides of the sheet. All edges may be of the same length, or one pair of parallel edges may be longer than the other pair of parallel edges. The sheets are formed into a belt by joining overlapping opposite marginal end regions of the sheet. A seam is typically produced in the overlapping marginal end regions at the point of joining. Joining of the aforementioned areas may be effected by any suitable means, such as by welding like ultrasonic welding, gluing, taping, pressure heat fusing, and the like.

Ultrasonic welding can be accomplished by retaining in a down position the overlapped ends of a flexible imaging member sheet with a vacuum against a flat anvil surface, and guiding the flat end of an ultrasonic vibrating horn transversely across the width of the sheet, over and along the length of the overlapped ends, to form a welded seam. Ultrasonically welding results in an overlap seam that has an irregular surface topology rendering it difficult for a cleaner blade to remove toner around the seam, and such welding can also cause damage to the cleaner blades by nicking the cleaning edge of the blade. In addition, toner trapping resulting from the poor cleaning and the blade damage causes streaking from the seam and creates an image quality problem. Many post fabrication seam smoothing techniques, which remove material from the seam, may also degrade seam strength.

Also, when ultrasonically welded into a belt, the seam of a multilayered electrophotographic flexible imaging member belt may occasionally contain undesirable high protrusions such as peaks, ridges, spikes, and mounds. These seam protrusions present problems during image cycling of the belt because they interact with the cleaning blade causing blade wear and tear, which can affect cleaning blade efficiency and reduce service life.

In a typical electrostatographic reproducing apparatus, a light image of an original to be copied is recorded in the form of an electrostatic latent image upon a photosensitive member or photoconductor, and the latent image is subsequently rendered visible by the application of electroscopic thermoplastic resin particles and colorant. Generally, the electrostatic latent image is developed by a developer mixture comprised of carrier granules having toner particles adhering triboelectrically thereto, or a liquid developer material, which may include a liquid carrier having toner particles dispersed therein. The developer material is advanced into contact with the electrostatic latent image, and the toner particles are deposited thereon in image configuration. Subsequently, the developed image is transferred to a copy sheet. It is advantageous to transfer the developed image to a coated intermediate transfer web, belt or component, and subsequently transfer with very high transfer efficiency the developed image from the intermediate transfer member to a permanent substrate. The toner image is subsequently usually fixed or fused upon a support, which may be the photoconductor or other support such as plain paper.

In electrostatographic printing machines wherein the toner image is electrostatically transferred by a potential difference between the imaging member and the intermediate transfer member, the transfer of the toner particles to the intermediate transfer member, and the retention thereof should be substantially complete so that the image ultimately transferred to the image receiving substrate will have a high resolution. Substantially about 100 percent toner transfer occurs when most or all of the toner particles comprising the image are transferred, and little residual toner remains on the surface from which the image was transferred.

Intermediate transfer members allow for a number of advantages such as enabling high throughput at modest process speeds, improving registration of the final color toner image in color systems using synchronous development of one or more component colors using one or more transfer stations, and increasing the variety of final substrates that can be used.

More specifically, a bump, surface irregularity, or other discontinuity in the seam of the belt may disturb the tuck of the cleaning blade as it makes intimate contact with the photoconductive member surface to effect residual toner and debris removal. The increased height differential may allow toner to pass under the cleaning blade, and not be cleaned. Furthermore, seams having differential heights may, when subjected to repeated striking by cleaning blades, cause photoconductive member cycling speed disturbance which adversely affects the crucial photoconductive belt motion quality. Moreover, seams with a bump or any morphological defects can cause the untransferred residual toner to be trapped in the sites of the seam surface irregularities. The seam of a photoreceptor belt, which is repeatedly subjected to the striking action by a cleaning blade under machine functioning conditions, can trigger the development of premature seam delamination failure. In addition, the discontinuity in belt thickness due to the presence of an excessive seam height yields variances of mechanical strength in the belt and reduces the fatigue flex life of the seam when cycling over belt module support rollers. As a result, both the cleaning life of the blade, and the overall service life of the photoreceptor belt can be diminished.

Moreover, the protrusion high spots in the seam may also interfere with the operation of subsystems of copiers, printers and duplicators by damaging electrode wires used in development that position the wires parallel to and closely spaced from the outer imaging surface of belt photoreceptors. These closely spaced wires are employed to facilitate the formation of a toner powder cloud at a development zone adjacent to a toner donor roll, and the imaging surface of the belt imaging member.

In operation, an intermediate transfer belt is contacted with a toner image bearing member such as a photoreceptor belt. In the contact zone, an electrostatic field generating device, such as a corotron, a bias transfer roller, a bias blade, or the like, creates electrostatic fields that transfer toner onto the intermediate transfer belt. Subsequently, the intermediate transfer belt is brought into contact with a receiver. An electrostatic field generating device then transfers toner from the intermediate transfer belt to the receiver. Depending on the system, a receiver can be another intermediate transfer member, or a substrate onto which the toner will eventually be fixed.

Thus, there is a need for a seamed member, such as a belt, that avoids or eliminates a number of the disadvantages mentioned herein, and more specifically, there is a need for an ITB with an improved seam or double welded seam surface topology such that it can withstand dynamic fatigue conditions. For example, the coated seam as disclosed herein provides a smoother surface with substantially decreased or eliminated profile protrusions or irregularities thereby extending its service life. There is also a need for a substantially completely imageable seam, which avoids or minimizes the disadvantages indicated herein by overcoating the seam with a conducting polymer mixture layer, and which layer is mechanically robust and electrically matches the surface resistivity of the seamed intermediate transfer belt (ITB), or intermediate transfer member, which resistivity is, for example, from about $10^9$ to about $10^{13}$ ohm/sq.

REFERENCES

Illustrated in U.S. Pat. No. 7,031,647 is an imageable seamed belt containing a lignin sulfonic acid doped polyaniline.

Illustrated in U.S. Pat. No. 7,139,519 is an intermediate transfer belt, comprising a belt substrate comprising primarily at least one polyimide polymer; and a welded seam.

Illustrated in U.S. Pat. No. 7,130,569 is a weldable intermediate transfer belt comprising a substrate comprising a homogeneous composition comprising a polyaniline in an amount of, for example, from about 2 to about 25 percent by weight of total solids, and a thermoplastic polyimide present in an amount of from about 75 to about 98 percent by weight of total solids, wherein the polyaniline has a particle size of, for example, from about 0.5 to about 5 microns.

Puzzle cut seam members are disclosed in U.S. Pat. Nos. 5,487,707; 6,318,223, and 6,440,515.

Illustrated in U.S. Pat. No. 6,602,156 is a polyaniline filled polyimide puzzle cut seamed belt, however, the manufacture of a puzzle cut seamed belt is labor intensive and very costly, and the puzzle cut seam, in embodiments, is sometimes weak. The manufacturing process for a puzzle cut seamed belt usually involves a lengthy in time high temperature and high humidity conditioning step. For the conditioning step, each individual belt is rough cut, rolled up, and placed in a conditioning chamber that is environmentally controlled at about 45° C. and about 85 percent relative humidity, for approximately 20 hours. To prevent or minimize condensation and watermarks, the puzzle cut seamed transfer belt resulting is permitted to remain in the conditioning chamber for a suitable period of time, such as 3 hours. The conditioning of the transfer belt renders it difficult to automate the manufacturing thereof, and the absence of such conditioning may adversely impact the belts electrical properties, which in turn results in poor image quality.

SUMMARY

According to embodiments illustrated herein, there is provided a flexible intermediate transfer member, such as a belt (ITB), that has an improved surface topology of its welded overlap seam while maintaining seam strength, and processes for the preparation of flexible belts.

In embodiments, there is disclosed a process for the treatment, especially post treatment of an ultrasonically welded seamed flexible imaging member belt comprising providing a flexible belt having at least one, such as one or two welded seams extending from one parallel edge to the other parallel edge, the welded seam having a rough seam region comprising an overlap of two opposite edges; positioning the flexible belt on a lower anvil such that the flexible belt is held in position on the lower anvil by a vacuum; contacting the rough seam region with a heat and pressure applying tool; and smoothing out the rough seam region with heat and pressure being applied by the heat and pressure applying tool to produce a flexible belt having a smooth welded seam without substantially removing any seam material; and then subsequently coating the seam with a crosslinked resin mixture of a glycoluril resin and a polyol resin; and an intermediate transfer member, such as an intermediate transfer belt, comprised of a seamed substrate, and wherein the seam is coated with a crosslinked resin mixture of a glycoluril resin and a polyol resin.

Embodiments illustrated herein also provide a process for the post treatment of an ultrasonically welded seamed flexible imaging member belt comprising providing a flexible belt having a welded seam extending from one parallel edge to the other parallel edge, the welded seam having a rough seam region comprising an overlap of two opposite edges; positioning the flexible belt on a lower anvil such that the flexible belt is held in position on the lower anvil by a vacuum; contacting the rough seam region with a heat and pressure applying tool, the heat and pressure applying tool being selected from the group consisting of an ultrasonic vibrating horn, an automated heated pressure roller, and a heated upper anvil; smoothing out the rough seam region with heat and pressure to produce a flexible belt having a smooth welded seam; and thereafter overcoating the seam with the resin mixture illustrated herein; and a process which comprises providing a flexible belt having a welded seam extending from one parallel edge to the other parallel edge, the welded seam having a rough seam region comprising an overlap of two opposite edges; positioning the flexible belt on a lower anvil such that the flexible belt is held in position on the lower anvil by a vacuum; contacting the rough seam region with a heat and pressure applying tool; and smoothing out the rough seam region with heat and pressure applied by the heat and pressure applying tool to produce a flexible belt having a smooth welded seam, and subsequently coating the entire seam with the resin mixture illustrated herein.

DETAILED DESCRIPTION

Aspects of the present disclosure relate to an intermediate transfer member comprised of a seamed substrate, and wherein the seam is coated with a mixture of a glycoluril resin and a polyol resin; a process which comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the seam with a mixture of a glycoluril resin and a polyol resin; and an intermediate transfer member comprised of a seamed substrate, and wherein the seam is coated with a mixture of a glycoluril resin and a polyol resin, wherein the glycoluril resin is represented by the formula/structure illustrated herein, and the polyol resin is an acrylic polyol copolymer generated by the polymerization of acrylic, derivatives of acrylic, methacrylic acid, derivatives of methacrylic acid, and other monomers and mixtures thereof; a process which comprises providing a flexible belt having a welded seam extending from one parallel edge to the other parallel edge, the welded seam having a rough seam region comprising an overlap of two opposite edges; positioning the flexible belt on the lower portion of an anvil such that the flexible belt is held in position on the lower anvil by a vacuum; contacting the rough seam region with heat and pressure; smoothing out the rough seam region with heat and pressure applied by a known heat and pressure applying device to produce a flexible belt having a smooth welded seam, and subsequently coating the seam with a mixture of a glycoluril resin and a polyol resin; an intermediate transfer member comprised of a seamed substrate, and wherein the seam is fully, for example from about 95 to about 100 percent, coated with a mixture of a glycoluril resin and a polyol resin; an intermediate transfer belt comprised of a seamed substrate, and wherein the seam is coated with a mixture of a glycoluril resin and a polyol resin together with a catalyst; and a polymeric coated seamed member inclusive of flexible belts, fuser belts, pressure belts, intermediate transfer belts, transfuse belts, transport belts, developer belts, photoreceptor belts, and the like where the polymeric coating is comprised of a glycoluril resin and a polyol resin; overcoating a welded seam, for example, a double welded seam (welded twice) with a polymeric layer comprised of a glycoluril resin and a polyol resin, which layer is mechanically robust and electrically matches the surface resistivity of the seamed ITB, which resistivity is from about $10^9$ to about $10^{13}$ ohm/sq.

The coated with a mixture of a glycoluril resin and a polyol resin seamed members, such as belts, flexible belts, photoreceptors, electroreceptors, and the like can be prepared by a number of processes, such as a process which forms a strength enhancing bond between voids of mutually mating elements. The strength enhancing bond may comprise a material which is chemically and physically compatible with the material of the coating layer or layers of the belt. The resin coated welded seam has a smoother surface topology to thereby improve both the cleaning life of the cleaning blade and the overall service life of the flexible belt. More specifically, embodiments disclosed herein relate to a post treatment process for efficiently and consistently smoothing an ultrasonically welded mixture of a glycoluril resin, and a polyol resin coated overlap seam of a flexible belt that does not degrade seam strength, and where the coating is mechanically robust, and electrically is equal to or about equal to the surface resistivity of the seamed belt.

Examples of the glycoluril resins are, for example, represented by the following formulas/structures

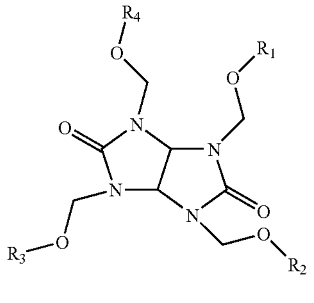

wherein each R substituent independently represents at least one of a hydrogen atom, and an alkyl with, for example, 1 to about 18, from 1 to about 10, or from 1 to about 4 carbon atoms.

Examples of the glycoluril resin include unalkylated and highly alkylated glycoluril resin like CYMEL® and POWDERLINK® glycoluril resins commercially available from CYTEC Industries, Inc. Specific examples of the disclosed glycoluril resin include CYMEL® 1170 (a highly butylated resin with at least 75 percent of the R groups being butyl with the remainder of the R groups being hydrogen; viscosity equal to about 3,000 to about 6,000 centipoise at 23° C.); CYMEL® 1171 (a highly methylated-ethylated with at least 75 percent of the R groups being methyl/ethyl and the remainder of the R groups being hydrogen, viscosity=to about 3,800 to about 7,500 centipoise at 23° C.); CYMEL® 1172 (an unalkylated resin with the R groups being hydrogen); and POWDERLINK® 1174 (a highly methylated resin with at least 75 percent of the R groups being methyl and the remainder of the R groups being hydrogen, a solid at 23° C.).

The number average molecular weight of the glycoluril resin is, for example, from about 200 to about 1,000 or from about 250 to about 600. The weight average molecular weight of the glycoluril resin is, for example, from about 230 to about 3,000 or from about 280 to about 1,800.

Examples of the polyol resin include acrylic polyol resins. In embodiments, acrylic polyol resin or acrylics examples include copolymers of derivatives of acrylic and methacrylic acid including acrylic and methacrylic esters, and compounds containing nitrile and amide groups, and other optional monomers. The acrylic esters can be selected from, for example, the group consisting of n-alkyl acrylates wherein alky contains in embodiments from 1 to about 25 carbon atoms, such as methyl, ethyl, propyl, butyl, pentyl, hexyl, heptyl, octyl, nonyl, decyl, dodecyl, tetradecyl, or hexadecyl acrylate; secondary and branched-chain alkyl acrylates such as isopropyl, isobutyl, sec-butyl, 2-ethylhexyl, or 2 ethylbutyl acrylate; olefinic acrylates such as allyl, 2-methylallyl, furfuryl, or 2 butenyl acrylate; aminoalkyl acrylates such as 2-(dimethylamino)ethyl, 2-(diethylamino)ethyl, 2-(dibutylamino)ethyl, or 3-(diethylamino)propyl acrylate; ether acrylates such as 2-methoxyethyl, 2-ethoxyethyl, tetrahydrofurfuryl, or 2-butoxyethyl acrylate; cycloalkyl acrylates such as cyclohexyl, 4-methylcyclohexyl, or 3,3,5-trimethylcyclohexyl acrylate; halogenated alkyl acrylates such as 2-bromoethyl, 2-chloroethyl, or 2,3-dibromopropyl acrylate; glycol acrylates and diacrylates such as ethylene glycol, propylene glycol, 1,3-propanediol, 1,4-butanediol, diethylene glycol, 1,5-pentanediol, triethylene glycol, dipropylene glycol, 2,5-hexanediol, 2,2-diethyl-1,3-propanediol, 2-ethyl-1,3-hexanediol, or 1,10-decanediol acrylate, and diacrylate. Examples of methacrylic esters can be selected from, for example, the group consisting of alkyl methacrylates such as methyl, ethyl, propyl, isopropyl, n-butyl, isobutyl, sec-butyl, t-butyl, n-hexyl, n-octyl, isooctyl, 2-ethylhexyl, n-decyl, or tetradecyl methacrylate; unsaturated alkyl methacrylates such as vinyl, allyl, oleyl, or 2-propynyl methacrylate; cycloalkyl methacrylates such as cyclohexyl, 1 methylcyclohexyl, 3-vinylcyclohexyl, 3,3,5-trimethylcyclohexyl, bornyl, isobornyl, or cyclopenta-2,4-dienyl methacrylate; aryl methacrylates such as phenyl, benzyl, or nonylphenyl methacrylate; hydroxyalkyl methacrylates such as 2-hydroxyethyl, 2 hydroxypropyl, 3-hydroxypropyl, or 3,4-dihydroxybutyl methacrylate; ether methacrylates such as methoxymethyl, ethoxymethyl, 2-ethoxyethoxymethyl, allyloxymethyl, benzyloxymethyl, cyclohexyloxymethyl, 1-ethoxyethyl, 2-ethoxyethyl, 2-butoxyethyl, 1-methyl-(2-vinyloxy)ethyl, methoxymethoxyethyl, methoxyethoxyethyl, vinyloxyethoxyethyl, 1-butoxypropyl, 1-ethoxybutyl, tetrahydrofurfuryl, or furfuryl methacrylate; oxiranyl methacrylates such as glycidyl, 2,3-epoxybutyl, 3,4-epoxybutyl, 2,3-epoxycyclohexyl, or 10,11-epoxyundecyl methacrylate; aminoalkyl methacrylates such as 2-dimethylaminoethyl, 2-diethylaminoethyl, 2-t-octylaminoethyl, N,N-dibutylaminoethyl, 3-diethylaminopropyl, 7-amino-3,4-dimethyloctyl, N-methylformamidoethyl, or 2-ureidoethyl methacrylate; glycol dimethacrylates such as methylene, ethylene glycol, 1,2-propanediol, 1,3-butanediol, 1,4-butanediol, 2,5-dimethyl-1,6-hexanediol, 1,10-decanediol, diethylene glycol, or triethylene glycol dimethacrylate; trimethacrylates such as trimethylolpropane trimethacrylate; carbonyl-containing methacrylates such as carboxymethyl, 2 carboxyethyl, acetonyl, oxazolidinylethyl, N-(2-methacryloyloxyethyl)-2-pyrrolidinone, N-methacryloyl-2-pyrrolidinone, N-(metharyloyloxy)formamide, N-methacryloylmorpholine, or tris(2-methacryloxyethyl)amine methacrylate; other nitrogen-containing methacrylates such as 2-methacryloyloxyethylmethyl cyanamide, methacryloyloxyethyl trimethylammonium chloride, N-(methacryloyloxy-ethyl)diisobutylketimine, cyanomethyl, or 2-cyanoethyl methacrylate; halogenated alkyl methacrylates such as chloromethyl, 1,3-dichloro-2-propyl, 4-bromophenyl, 2-bromoethyl, 2,3-dibromopropyl, or 2-iodoethyl methacrylate; sulfur-containing methacrylates such as methylthiol, butylthiol, ethylsulfonylethyl, ethylsulfinylethyl, thiocyanatomethyl, 4-thiocyanatobutyl, methylsulfinylmethyl, 2-dodecylthioethyl methacrylate, or bis(methacryloyloxyethyl)sulfide; phosphorous-boron-silicon-containing methacrylates such as 2-(ethylenephosphino)propyl, dimethylphosphinomethyl, dimethylphosphonoethyl, diethylphosphatoethyl, 2-(dimethylphosphato)propyl, 2-(dibutylphosphono)ethyl methacrylate, diethyl methacryloylphosphonate, dipropyl methacryloyl phosphate, diethyl methacryloyl phosphite, 2-methacryloyloxyethyl diethyl phosphite, 2,3-butylene methacryloyl-oxyethyl borate, or methyldiethoxymethacryloyloxyethoxysilane. Methacrylic amides and nitriles can be selected from the group consisting of at least one of N-methylmethacrylamide, N-isopropylmethacrylamide, N-phenylmethacrylamide, N-(2-hydoxyethyl)methacrylamide, 1-methacryloylamido-2-methyl-2-propanol, 4-methacryloylamido-4-methyl-2-pentanol, N-(methoxymethyl)methacrylamide, N-(dimethylaminoethyl)methacrylamide, N-(3-dimethylaminopropyl)methacrylamide, N-acetylmethacrylamide, N-methacryloylmaleamic acid, methacryloylamido acetonitrile, N-(2-cyanoethyl) methacrylamide, 1-methacryloylurea, N-phenyl-N-phenylethylmethacrylamide, N-(3-dibutylaminopropyl)methacrylamide, N,N-diethylmethacrylamide, N-(2-cyanoethyl)-N-methylmethacrylamide, N,N-bis(2-diethylaminoethyl) methacrylamide, N-methyl-N-phenylmethacrylamide, N,N'-methylenebismethacrylamide, N,N'-ethylenebismethacrylamide, or N-(diethylphosphono) methacrylamide. Further optional monomer examples selected are styrene, acrolein, acrylic anhydride, acrylonitrile, acryloyl chloride, methacrolein, methacrylonitrile, methacrylic anhydride, methacrylic acetic anhydride, methacryloyl chloride, methacryloyl bromide, itaconic acid, butadiene, vinyl chloride, vinylidene chloride, or vinyl acetate.

Further specific examples of acrylic polyol resins include PARALOID™ AT-410 (acrylic polyol, 73 percent in methyl amyl ketone, Tg=30° C., OH equivalent weight=880, acid number=25, $M_w$=9,000), AT-400 (acrylic polyol, 75 percent in methyl amyl ketone, Tg=15° C., OH equivalent weight=650, acid number=25, $M_w$=15,000), AT-746 (acrylic polyol, 50 percent in xylene, Tg=83° C., OH equivalent weight=1,700, acid number=15, $M_w$=45,000), AE-1285 (acrylic polyol, 68.5 percent in xylene/butanol=70/30, Tg=23° C., OH equivalent weight=1,185, acid number=49, $M_w$=6,500), and AT-63 (acrylic polyol, 75 percent in methyl amyl ketone, Tg=25° C., OH equivalent weight=1,300, acid number=30), all available from Rohm and Haas, Philadelphia, Pa.; JONCRYL® 500 (styrene acrylic polyol, 80 percent in methyl amyl ketone, Tg=−5° C., OH equivalent weight=400), 550 (styrene acrylic polyol, 62.5 percent in PM-acetate/toluene=65/35, OH equivalent weight=600), 551 (styrene acrylic polyol, 60 percent in xylene, OH equivalent weight=600), 580 (styrene acrylic polyol, Tg=50° C., OH equivalent weight=350, acid number=10, $M_w$=15,000), 942 (styrene acrylic polyol, 73.5 percent in n-butyl acetate, OH equivalent weight=400), and 945 (styrene acrylic polyol, 78 percent in n-butyl acetate, OH equivalent weight=310), all available from Johnson Polymer, Sturtevant, Wis.; RU-1100-1k™ with a $M_n$ of 1,000 and 112 hydroxyl value, and RU 1550-k5™ with a $M_n$ of 5,000 and 22.5 hydroxyl value, both available from Procachem Corp.; G-CURE™ 108A70, available from Fitzchem Corp.; NEOL® polyol, available from BASF; TONE™ 0201 polyol with a $M_n$ of 530, a hydroxyl number of 117, and acid number of <0.25, available from Dow Chemical Company.

The number average molecular weight of the polyol resin is, for example, from about 400 to about 50,000 or from about 1,000 to about 10,000. The weight average molecular weight of the polyol resin is, for example, from about 500 to about 100,000 or from about 1,500 to about 20,000. The polyol resin is present in an amount of, for example, from about 1 to about 99, about 10 to about 80 weight percent, or from about 30 to about 50 weight percent of the total overcoated layer components. By the addition of a small amount of an acid catalyst, the mixture of the glycoluril resin and the polyol resin crosslinks upon thermal curing at temperatures of, for example, from about 80° C. to about 200° C. for a suitable time period, such as for example, from about 1 to about 60 minutes, and more specifically, curing at about 130° C. for 3 minutes, resulting in a mechanically robust mixture of a glycoluril resin and a polyol resin layer with a surface resistivity of from about $10^9$ to about $10^{13}$ ohm/sq, and specifically about $10^{11}$ ohm/sq. While the percentage of crosslinking can be difficult to determine, and not being desired to be limited by theory, the mixture of the glycoluril resin and the polyol resin layer is crosslinked to a suitable value, such as for example, from about 30 to about 100 percent, or from about 50 to about 95 percent.

The thickness of the layer comprised of the mixture of a glycoluril resin and a polyol resin coating on the seam can vary; for example, this thickness can be from about 1 to about 30, from about 2 to about 16, from about 3 to about 12, and yet more specifically, 6 microns.

When the entire seam is overcoated, the width of the mixture of a glycoluril resin and a polyol resin coating on the seam can vary; for example, this width can be from about 1 to about 20, from about 1 to about 10, and yet more specifically, about 6 centimeters.

The circumference of the transfer member in a film or belt configuration of from 1 to 2, or more layers is, for example, from about 250 to about 2,500 millimeters, from about 1,500 to about 2,500 millimeters, or from about 2,000 to about 2,200 millimeters. The width of the film or belt is, for example, from about 100 to about 1,000 millimeters, from about 200 to about 500 millimeters, or from about 300 to about 400 millimeters. The thickness of the film or belt is, for example, from about 25 to about 500 microns, or from about 50 to 150 microns.

Nonlimiting examples of catalysts selected for the crosslinking of the polymeric mixture of a glycoluril resin and a polyol resin include oxalic acid, maleic acid, carboxylic acid, ascorbic acid, malonic acid, succinic acid, tartaric acid, citric acid, p-toluenesulfonic acid, methanesulfonic acid, and the like, and mixtures thereof. A typical concentration of acid catalyst is, for example, from about 0.01 to about 5 weight percent, about 0.5 to about 4 weight percent, and about 1 to about 3 weight percent based on the weight of the mixture of a glycoluril resin and a polyol resin.

A blocking agent can also be included in the overcoat layer, which agent can "tie up" or substantially block the acid catalyst effect to provide solution stability until the acid catalyst function is initiated. Thus, for example, the blocking agent can block the acid effect until the solution temperature is raised above a threshold temperature. For example, some blocking agents can be used to block the acid effect until the solution temperature is raised above about 100° C. At that time, the blocking agent dissociates from the acid and vaporizes. The unassociated acid is then free to catalyze the polymerization. Examples of such suitable blocking agents include, but are not limited to, pyridine and commercial acid solutions containing blocking agents, such as CYCAT® 4045, available from Cytec Industries Inc.

The disclosed seam overcoat further optionally comprises a siloxane component or a fluoro component present in an amount of, for example, from about 0.1 to about 20 weight percent or from about 0.5 to about 5 weight percent, which component can co-crosslink with the two resins and thereby render the overcoat with excellent slippery characteristics.

Examples of the crosslinkable siloxane component include hydroxyl derivatives of silicone modified polyacrylates such as BYK-SILCLEAN® 3700; polyether modified acryl polydimethylsiloxanes such as BYK-SILCLEAN® 3710; and polyether modified hydroxyl polydimethylsiloxanes such as BYK-SILCLEAN® 3720. BYK-SILCLEAN® is a trademark of BYK.

Examples of the crosslinkable fluoro component include (1) hydroxyl derivatives of perfluoropolyoxyalkanes such as FLUOROLINK® D (M.W. of about 1,000 and a fluorine content of about 62 percent), FLUOROLINK® D10-H (M.W. of about 700 and fluorine content of about 61 percent), and FLUOROLINK® D10 (M.W. of about 500 and fluorine content of about 60 percent) (functional group $—CH_2OH$); FLUOROLINK® E (M.W. of about 1,000 and a fluorine content of about 58 percent), and FLUOROLINK® E10 (M.W. of about 500 and fluorine content of about 56 percent) (functional group $—CH_2(OCH_2CH_2)_nOH$); FLUOROLINK® T (M.W. of about 550 and fluorine content of about 58 percent), and FLUOROLINK® T10 (M.W. of about 330 and fluorine content of about 55 percent) (functional group $—CH_2OCH_2CH(OH)CH_2OH$); (2) hydroxyl derivatives of perfluoroalkanes ($R_fCH_2CH_2OH$, wherein $R_f$=F$(CF_2CF_2)_n$) wherein n represents the number of groups, such as about 1 to about 50, such as ZONYL® BA (M.W. of about 460 and fluorine content of about 71 percent), ZONYL® BA-L (M.W. of about 440 and fluorine content of about 70 percent), ZONYL® BA-LD (M.W. of about 420 and fluorine content of about 70 percent), and ZONYL® BA-N (M.W. of about 530 and fluorine content of about 71 percent); (3) carboxylic acid derivatives of fluoropolyethers such as FLUOROLINK® C (M.W. of about 1,000 and fluorine content of about 61 percent); (4) carboxylic ester derivatives of fluoropolyethers such as FLUOROLINK® L (M.W. of about 1,000 and fluorine content of about 60 percent), FLUOROLINK® L10 (M.W. of about 500 and fluorine content of about 58 percent); (5) carboxylic ester derivatives of perfluoroalkanes ($R_fCH_2CH_2O(C{=}O)R$ wherein $R_f$=F$(CF_2CF_2)_n$, and n is as illustrated herein, and R is alkyl) such as ZONYL® TA-N (fluoroalkyl acrylate, R=$CH_2$=CH—, M.W. of about 570 and fluorine content of about 64 percent), ZONYL® TM (fluoroalkyl methacrylate, R=$CH_2$=$C(CH_3)$—, M.W. of about 530 and fluorine content of about 60 percent), ZONYL® FTS (fluoroalkyl stearate, R=$C_{17}H_{35}$—, M.W. of about 700 and fluorine content of about 47 percent), ZONYL® TBC (fluoroalkyl citrate, M.W. of about 1,560 and fluorine content of about 63 percent); (6) sulfonic acid derivatives of perfluoroalkanes ($R_fCH_2CH_2$ $SO_3H$, wherein $R_f$=F$(CF_2CF_2)_n$), and n is as illustrated herein, such as ZONYL® TBS (M.W. of about 530 and fluorine content of about 62 percent); (7) ethoxysilane derivatives of fluoropolyethers such as FLUOROLINK® S10 (M.W. of about 1,750 to about 1,950); and (8) phosphate derivatives of fluoropolyethers such as FLUOROLINK® F10 (M.W. of about 2,400 to about 3,100). The FLUOROLINK® additives are available from Ausimont USA, and the ZONYL® additives are available from E.I. DuPont.

Examples of additional optional components present in the disclosed seam overcoat include a number of known conductive components, such as polyaniline, carbon black or metal oxide, present in an amount of from about 0.1 to about 60 weight percent, or from about 1 to about 30 weight percent, or from about 3 to about 15 weight percent.

In embodiments, the polyaniline component selected has, in embodiments, a relatively small particle size of, for example, from about 0.5 to about 5 microns, from about 1.1 to about 2.3 microns, from about 1.2 to about 2 microns, from about 1.5 to about 1.9 microns, or about 1.7 microns. Specific examples of polyanilines selected for the seam overcoat are PANIPOL™ F, commercially available from Panipol Oy, Finland; and lignosulfonic acid grafted polyaniline.

Examples of carbon blacks selected include VULCAN® carbon blacks, REGAL® carbon blacks, and BLACK PEARLS® carbon blacks available from Cabot Corporation. Specific examples of conductive carbon blacks are BLACK PEARLS® 1000 (B.E.T. surface area=343 $m^2/g$, DBP absorption=105 ml/g), BLACK PEARLS® 880 (B.E.T. surface area=240 $m^2/g$, DBP absorption=106 ml/g), BLACK PEARLS® 800 (B.E.T. surface area=230 $m^2/g$, DBP absorption=68 ml/g), BLACK PEARLS® L (B.E.T. surface area=138 $m^2/g$, DBP absorption=61 ml/g), BLACK PEARLS® 570 (B.E.T. surface area=110 $m^2/g$, DBP absorption=114 ml/g), BLACK PEARLS® 170 (B.E.T. surface area=35 $m^2/g$, DBP absorption=122 ml/g), VULCAN® XC72 (B.E.T. surface area=254 $m^2/g$, DBP absorption=176 ml/g), VULCAN® XC72R (fluffy form of VULCAN® XC72), VULCAN® XC605, VULCAN® XC305, REGAL® 660 (B.E.T. surface area=112 $m^2/g$, DBP absorption=59 ml/g), REGAL® 400 (B.E.T. surface area=96 $m^2/g$, DBP absorption=69 ml/g), and REGAL® 330 (B.E.T. surface area=94 $m^2/g$, DBP absorption=71 ml/g). Dibutyl phthalate (DBP) absorption by the voids within carbon blacks are used to measure the structure of carbon black. The higher the structure, the more the voids, and the higher is the DBP absorption.

Examples of metal oxide include tin oxide, antimony doped tin oxide, indium oxide, indium tin oxide, zinc oxide, and titanium oxide.

The end marginal regions of the transfer member can be joined by any suitable means including gluing, taping, stapling, pressure, and heat fusing to form a continuous member such as a belt, sleeve, or cylinder. Both heat and pressure can be used to bond the end marginal regions into a seam in the overlap region. The flexible member is thus transformed from a sheet of an intermediate transfer material into a continuous intermediate transfer belt. The flexible member has a first exterior major surface or side, and a second exterior major surface or side on the opposite side. The seam joins the flexible member so that the bottom surface, generally including at least one layer immediately above, at and/or near the first end marginal region is integral with the top surface, generally including at least one layer immediately below, at and/or near the second end marginal region.

A heat and pressure seam joining means includes ultrasonic welding to transform the sheet of an intermediate transfer material into an intermediate transfer belt. The belt can be fabricated by ultrasonic welding of the overlapped opposite end regions of a sheet. In the ultrasonic seam welding process, ultrasonic energy applied to the overlap region is used to melt suitable layers.

Ultrasonic welding is selected, in embodiment, for joining the flexible intermediate transfer member because it is rapid, clean and solvent free, and of low cost, and it produces a thin and narrow seam. In addition, ultrasonic welding is selected since the mechanical high frequency pounding of the welding horn causes the generation of heat at the contiguous overlapping end marginal regions of the flexible imaging sheet loop to maximize melting of one or more layers therein to form a strong and precisely defined seam joint. For example, ultrasonic welding, and an apparatus for performing the same is disclosed in U.S. Pat. No. 4,532,166, the disclosure of which is totally incorporated herein by reference.

In a specific embodiment, the heat and pressure applying tool is an ultrasonic vibrating horn. In such an embodiment, the lower anvil selected may be a flat anvil. This tool smoothes out the rough seam region by proceeding with a second welding pass across the welded region such that the rough seam region is further compressed under high pressure and heat. Since the post treatment smoothing process uses the welding horn to further compress the overlap, rather than removing the protruding material, seam strength is not substantially degraded. Moreover, the welded seam may be double welded from the back side of the seam as well. In such embodiments, the second welding pass is accomplished with the seam inverted on the anvil so that the imaging side of the belt is facing down on the anvil. In this manner, the overlap on the image side of the belt can be substantially eliminated as it conforms to the smooth surface of the anvil.

The heat and pressure applying tool is, in embodiments, an automated heated pressure roller or a heated upper anvil. In these embodiments, the lower anvil is a round anvil, and an edge of the seam region is positioned on an apex of the lower anvil, and where a smooth seam with no protrusion results by traversing the automated heated pressure roller along the seam to reform the edge of the seam region. The heated pressure roller applies pressure on the welded seam against the lower anvil while heating the seam such that a smooth welded seam is produced with the belt held in place by a vacuum on the lower anvil while the heated pressure roller traverses the seam. To effectively heat roll the seam smooth, the roller to the seam is positioned so as to be located on the apex of the anvil to fully expose the area to be smoothed. The surface of the roller should be tangent to the anvil's apex. Using a round anvil allows heat and pressure to be concentrated along the edge of the overlap. In further embodiments, the heated pressure roller is used in an automated system where the heated roller is affixed to a linear actuator which drives it tangent to the roller's apex along its length. Temperature may be controlled by means of a thermostat controller while pressure may be controlled by spring tension.

By applying the heated upper anvil to the edge of the seam region, and where the welded seam is sandwiched between the upper and lower anvils, the welded seam is thus compressed under high pressure. Both the upper and lower anvils may be heated so that during the compression, the seam material is also heated close to its glass transition temperature to further facilitate the reformation of the welded seam and to produce a smooth welded seam. The upper and lower anvils may be heated by heating components embedded in the upper and lower anvils, and which are controlled by a thermostatic controller. In this embodiment, the welded seam may be reduced in seam thickness by from about 25 percent to about 35 percent.

The following Examples are provided.

Comparative Example 1

A seamed intermediate transfer belt was prepared as follows. A 3 mil intermediate transfer sheet comprised of a mixture of 91 weight percent of KAPTON® KJ (available from E.I. DuPont) and 9 weight percent of polyaniline (1.7 microns in diameter size) was cut to a size of 362 millimeters wide by 2210.8 millimeters long. The ends were overlapped by 250 microns, and an ultrasonic horn was used to compress the above mixture against a steel welding platen, melting the mixture in the overlap region, and creating a seam. The seam was then reverse welded, resulting in a seam of about 100 microns thick.

Example I

The Comparative Example 1 seamed ITB was overcoated (overcoat layer) by a known draw bar coating method. The overcoat layer coating solution was prepared by introducing into an amber glass bottle in a weight ratio of 66:33:1 CYMEL® 1170, a highly butylated glycoluril resin represented by

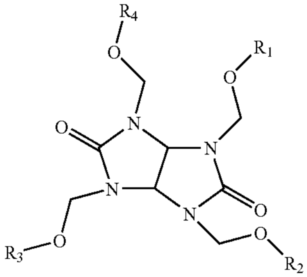

with at least 75 percent of the R groups being butyl, and the remainder of the R groups being hydrogen, with a viscosity of from about 3,000 to about 6,000 centipoise at 23° C., commercially available from CYTEC Industries, Inc; JONCRYL® 580, a styrene acrylic polyol resin, $T_g$=50° C., OH equivalent weight=350, acid number=10, $M_w$=15,000, commercially available from Johnson Polymers; and p-toluenesulfonic acid (pTSA). The resulting mixture was then dissolved in DOWANOL™ to form a solution containing 15 percent by weight solids.

The resulting overcoat layer was crosslinked upon thermal curing at 160° C. for 5 minutes, resulting in a 6 micron, mechanically robust polymeric layer comprised of CYMEL® 1170/JONCRYL® 580/pTSA=66/33/1 with a surface resistivity of about $2.84\times10^{11}$ ohm/sq, which matched that of the ITB itself. The surface resistivity of the overcoat was measured using a High Resistivity Meter (Hiresta-Up MCP-HT450 from Mitsubishi Chemical Corp., under 1,000 V, averaging four measurements at varying spots, 72° F./65 percent room humidity).

The overcoated seamed ITB of Example I and the non-coated seamed ITB of Comparative Example 1 were print tested on a Xerox Corporation DC8000 printer. After 100 prints, full page image quality analysis of 50 percent of the halftone images were visually evaluated (Table 1), especially around the overcoated seam areas.

TABLE 1

| Image Evaluation After 100 Prints | Printed Overcoated Seam Area | Printed Overcoated Non-Seam Area |
|---|---|---|
| Comparative Example 1 | Seam visible with distinguishable change in halftone quality | Overcoat visible with distinguishable change in halftone quality |
| Example I | Seam invisible with no distinguishable change in halftone quality | Overcoat invisible with no distinguishable change in halftone quality |

The above data demonstrates that the Example I overcoated imageable seam layer, 6 μm in thickness, had the advantages indicated. The seams were formed, as illustrated herein, by a first ultrasonic welding, and then turned upside down and welded a second time. Both the overcoated area and the seam were invisible for 100 xerographic prints, while for the Comparative Example 1 ITB noncoated seam, the seam was visible for each of the 100 xerographic prints. The glycoluril resin/acrylic polyol resin of Example I overcoated ITB was mechanically robust, and the seamed region remained invisible for 400,000 prints in contrast to the Comparative Example 1 ITB where the seamed region was visible beginning with the first print, and remained visible for 400,000 prints.

Example II

The above process of Example I was repeated except that the overcoat layer coating solution was prepared by introducing into an amber glass bottle in a weight ratio of 66:32:1:1 CYMEL® 1170, a highly butylated glycoluril resin as represented by

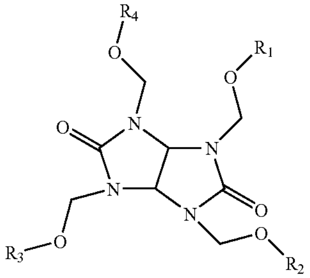

with 75 percent of the R groups being butyl, and the remainder of the R groups being hydrogen; ($R_1$, $R_2$ and $R_3$ are butyl, and $R_4$ is H); viscosity of 3,000 to 6,000 centipoise at 23° C., and commercially available from CYTEC Industries, Inc; JONCRYL® 580, a styrene acrylic polyol resin, $T_g$=50° C., OH equivalent weight=350, acid number=10, $M_w$=15,00, commercially available from Johnson Polymers; p-toluenesulfonic acid (pTSA); and BYK-SILCLEAN® 3700, a hydroxyl derivative of silicone modified polyacrylate (siloxane component), commercially available from BYK. The resulting mixture was then dissolved in DOWANOL™ to form a solution containing 15 percent by weight solids.

The disclosed overcoat layer was crosslinked upon thermal curing at 160° C. for 5 minutes, resulting in a 6 micron thick, mechanically robust polymeric layer comprised of CYMEL® 1170/JONCRYL® 580/pTSA/SILCLEAN® 3700=66/32/1/1 with a surface resistivity of about $2.50\times10^{11}$ ohm/sq, which matched that of the ITB itself.

The coefficients of kinetic friction of the overcoated seamed ITBs of Examples I and II against a polished stainless steel surface were measured by a COF Tester (Model D5095D, Dynisco Polymer Test, Morgantown, Pa.) according to ASTM D1894-63, procedure A. The tester was facilitated with a 2.5"×2.5", 200 gram weight with rubber on one side, a moving polished stainless steel sled, and a DFGS force gauge (250 gram maximum). The seam coated ITBs were cut into 2.5"×3.5" pieces and taped onto the 200 gram weight on the rubber side with the surfaces to be tested facing the sled. The coefficient of kinetic friction refers to the ratio of the kinetic friction force (F) between the surfaces in contact to the normal force: F/N, where F was measured by the gauge, and N is the weight (200 grams). The measurements were conducted at a sled speed of 6"/minute and at ambient conditions. Three measurements were performed for each seam coated ITB and their averages, and standard deviations are reported in Table 2.

TABLE 2

| | Friction Coefficient |
|---|---|
| Example I | 0.39 |
| Example II | 0.25 |

Incorporation of a siloxane component into the overcoat (Example II) rendered the overcoat layer about 40 percent more slippery than the Example I overcoat without any siloxane component. The more slippery overcoat layer is believed to be further beneficial to toner transfer and cleaning, resulting in an imageable seam.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A xerographic intermediate transfer member consisting of a seamed substrate, wherein said seam is coated with a mixture of a glycoluril resin, a polyol resin, an optional acid catalyst, an optional siloxane component, and an optional fluoro component, and further consisting of an optional outer release layer.

2. An intermediate transfer member in accordance with claim 1 wherein said substrate includes carbon black and a polymer selected from the group consisting of a polyimide, a polycarbonate, a polyamidimide, a polyphenylene sulfide, a polyamide, a polysulfone, a polyetherimide, a polyester or polyester copolymer, the polyvinylidene fluoride, a polyethylene-co-polytetrafluoroethylene, and mixtures thereof.

3. An intermediate transfer member in accordance with claim 1 wherein said substrate consists of a polyaniline, and a polymer selected from the group consisting of a polyimide, a polycarbonate, a polyamidimide, a polyphenylene sulfide, a polyamide, a polysulfone, a polyetherimide, a polyester or polyester copolymer, a polyvinylidene fluoride, a polyethylene-co-polytetrafluoroethylene, and mixtures thereof.

4. An intermediate transfer member in accordance with claim 1 wherein said substrate consists of a metal oxide and a polymer selected from the group consisting of a polyimide, a polycarbonate, a polyamidimide, a polyphenylene sulfide, a polyamide, a polysulfone, a polyetherimide, a polyester or polyester copolymer, a polyvinylidene fluoride, a polyethylene-co-polytetrafluoroethylene, and mixtures thereof.

5. An intermediate transfer member in accordance with claim 1 wherein said mixture of a glycoluril resin and a polyol resin consists of from about 1 to about 99 weight percent of said glycoluril, and from 99 to about 1 weight percent of said polyol, and wherein the total solids thereof is about 100 percent.

6. An intermediate transfer member in accordance with claim 1 wherein said mixture of a glycoluril resin and a polyol resin consists of from about 55 to about 85 weight percent of said glycoluril, and from 45 to about 15 weight percent of said polyol, and wherein the total solids thereof is about 100 percent.

7. An intermediate transfer member in accordance with claim 1 wherein said glycoluril resin is represented by

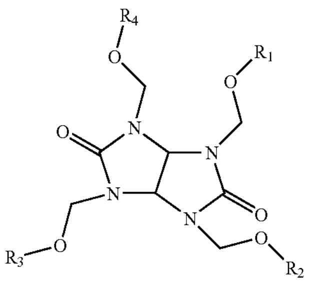

wherein each R group is at least one of hydrogen and alkyl.

8. An intermediate transfer member in accordance with claim 7 wherein said glycoluril resin possesses a number average molecular weight of from about 200 to about 1,000, and a weight average molecular weight of from about 230 to about 3,000, and each R group is alkyl with from about 1 to about 4 carbon atoms.

9. An intermediate transfer member in accordance with claim 7 wherein said glycoluril resin possesses a number average molecular weight of from about 250 to about 600, and a weight average molecular weight of from about 280 to about 1,800, and each R is n-butyl, isobutyl, methyl, or ethyl.

10. An intermediate transfer member in accordance with claim 7 wherein each of said R groups is hydrogen.

11. An intermediate transfer member in accordance with claim 7 wherein each of said R groups is alkyl with from 1 to about 10 carbon atoms.

12. An intermediate transfer member in accordance with claim 1 wherein said polyol resin is an acrylic polyol polymer generated from the polymerization of acrylic, derivatives of acrylic, methacrylic acid, derivatives of methacrylic acid, and optional monomers and mixtures thereof.

13. An intermediate transfer member in accordance with claim 12 wherein said derivatives of acrylic and said derivatives of methacrylic acid are selected from the group consisting of n-alkyl acrylates, secondary and branched-chain alkyl acrylates, olefinic acrylates, aminoalkyl acrylates, ether acrylates, cycloalkyl acrylates, halogenated alkyl acrylates, glycol acrylates and diacrylates, alkyl methacrylates, unsaturated alkyl methacrylates, cycloalkyl methacrylates, aryl methacrylates, hydroxyalkyl methacrylates, ether methacrylates, oxiranyl methacrylates, aminoalkyl methacrylates, glycol dimethacrylates, trimethacrylates, carbonyl-containing methacrylates, other nitrogen-containing methacrylates, halogenated alkyl methacrylates, sulfur-containing methacrylates, phosphorous-boron-silicon-containing methacrylates, N-methylmethacrylamide, N-isopropylmethacrylamide, N-phenylmethacrylamide, N-(2-hydroxyethyl) methacrylamide, 1-methacryloylamido-2-methyl-2-propanol, 4-methacryloylamido-4-methyl-2-pentanol, N-(methoxymethyl)methacrylamide, N-(dimethylaminoethyl)methacrylamide, N-(3-dimethylaminopropyl)methacrylamide, N-acetylmethacrylamide, N-methacryloylmaleamic acid, methacryloylamidoacetonitrile, N-(2-cyanoethyl)methacrylamide, 1-methacryloylurea, N-phenyl-N-phenylethylmethacrylamide, N-(3-dibutylaminopropyl)methacrylamide, N,N-diethylmethacrylamide, N-(2-cyanoethyl)-N-methylmethacrylamide, N,N-bis(2-diethylaminoethyl)methacrylamide, N-methyl-N-phenylmethacrylamide, N,N'-methylenebismethacrylamide, N,N'-ethylenebismethacrylamide, or N-(diethylphosphono)methacrylamide, and mixtures thereof, and said optional monomers are present and are selected from the group consisting of styrene, acrolein, acrylic anhydride, acrylonitrile, acryloyl chloride, methacrolein, methacrylonitrile, methacrylic anhydride, methacrylic acetic anhydride, methacryloyl chloride, methacryloyl bromide, itaconic acid, butadiene, vinyl chloride, vinylidene chloride, or vinyl acetate, and mixtures thereof.

14. An intermediate transfer member in accordance with claim 1 wherein said acid catalyst is present in an amount of from about 0.1 to about 2 weight percent, and at least one of said siloxane component and said fluoro component is present in an amount of from about 0.1 to about 5 weight percent.

15. An intermediate transfer member in accordance with claim 14 wherein said acid catalyst is a toluenesulfonic acid; said siloxane component is a hydroxyl derivative of silicone modified polyacrylate, a polyether modified acryl polydimethylsiloxane, a polyether modified hydroxyl polydimethylsiloxane, or an alkoxysilane comprised of at least one alkoxy group bonding to at least one silicon atom, and said alkoxy is methoxy, ethoxy, n-propoxy, isopropoxy, n-butoxy, or isobutoxy; and said fluoro component is at least one of hydroxyl derivatives of perfluoropolyoxyalkanes; hydroxyl derivatives of perfluoroalkanes; carboxylic acid derivatives of fluoropolyethers; carboxylic ester derivatives of fluoropolyethers; carboxylic ester derivatives of perfluoroalkanes; sulfonic acid derivatives of perfluoroalkanes; silane derivatives of fluoropolyethers; and phosphate derivatives of fluoropolyethers.

16. An intermediate transfer member in accordance with claim 1 wherein said outer release layer is positioned on said substrate.

17. An intermediate transfer member in accordance with claim 16 wherein said release layer consists of a fluorinated ethylene propylene copolymer, a polytetrafluoroethylene, a polyfluoroalkoxy polytetrafluoroethylene, a fluorosilicone, a copolymer or terpolymer of vinylidenefluoride, hexafluoropropylene or tetrafluoroethylene, and mixtures thereof.

18. A xerographic intermediate transfer belt consisting of a supporting substrate, and in contact with said substrate a layer of a crosslinked mixture of a glycoluril resin, a polyol resin, and an optional catalyst and wherein said crosslinking is from about 50 to about 95 percent.

19. An intermediate transfer belt in accordance with claim 18 wherein said substrate contains at least one seam, and which seam is coated with said mixture, and wherein prior to said coating the seam has a roughened surface, and subsequent to said coating the seamed area is smooth.

20. An intermediate transfer belt in accordance with claim 19 wherein said catalyst is present, and wherein said substrate possesses two seams.

21. An intermediate transfer belt in accordance with claim 18 wherein said glycoluril resin is a butylated glycoluril formaldehyde resin present in an amount of from about 50 to about 90 weight percent, and said polyol resin is a styrene acrylic resin present in an amount of from about 50 to about 10 weight percent, wherein the total solids thereof is about 100 percent.

* * * * *